J. MULLALY.
Angling-Flies.
No. 139,180.
Patented May 20, 1873.
Witnesses
Elea Connolly
Martin Connolly
Inventor
John Mullaly
Connolly Bros.
Atty's

UNITED STATES PATENT OFFICE.

JOHN MULLALY, OF NEW YORK, N. Y.

IMPROVEMENT IN ANGLING-FLIES.

Specification forming part of Letters Patent No. 139,180, dated May 20, 1873; application filed January 25, 1873.

*To all whom it may concern:*

Be it known that I, JOHN MULLALY, of New York, in the county of New York and State of New York, have invented certain new and useful Improvements in Fishing-Flies; and I do hereby declare that the following is a full, clear, and exact description thereof, that will enable others skilled in the art to which it appertains to make and use the same, reference being had to the accompanying drawing, and to the letters of reference marked thereon, which form a part of this specification:

The accompanying drawing is a perspective representation of my invention.

My invention has reference to the artificial fly used in fishing, the design being to produce a more deceptive device than has heretofore been secured. The invention consists in the construction and arrangement of the hook, as will hereinafter be described.

Heretofore, in constructing the fly used in fishing, it has been customary to make the hook a prolongation of the body of the insect, the bend being downward and consequently exposed. My invention consists in arranging the hook so that the bend and point or barb shall be concealed by the wings.

Referring to the drawing, A shows a fly constructed according to my invention. The body is shown at $a$, incasing the shank, and rising from it are the wings $a^1$ $a^1$. The bend of the hook is shown at $a^2$, passing upward between the wings, by which it is concealed from view of the fish. A fly thus constructed will be found more deceptive and consequently more serviceable than those commonly employed. The hook being concealed will be readily and unsuspectingly taken by the fish. The wings also form a sort of float and the hook operates as ballast, so that the fly retains its natural position on the water, and even if it should become inverted it will right itself readily.

What I claim as my invention, and desire to secure by Letters Patent, is—

An artificial fishing-fly and an attached hook arranged with the bend $a^2$ outside of the body and between the wings, so as to be concealed by the same, substantially as shown and described.

In testimony that I claim the foregoing I have hereunto set my hand.

JOHN MULLALY.

Witnesses:
 JOS. T. K. PLANT,
 M. DANL. CONNOLLY.